United States Patent
Yang

(10) Patent No.: US 12,137,495 B2
(45) Date of Patent: Nov. 5, 2024

(54) INACTIVITY TIMER CONTROL METHOD AND DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 17/635,285

(22) PCT Filed: Aug. 14, 2019

(86) PCT No.: PCT/CN2019/100611
§ 371 (c)(1),
(2) Date: Feb. 14, 2022

(87) PCT Pub. No.: WO2021/026824
PCT Pub. Date: Feb. 18, 2021

(65) Prior Publication Data
US 2022/0295590 A1  Sep. 15, 2022

(51) Int. Cl.
*H04W 76/25* (2018.01)
*H04W 76/14* (2018.01)
*H04W 76/30* (2018.01)

(52) U.S. Cl.
CPC ........... *H04W 76/25* (2018.02); *H04W 76/14* (2018.02); *H04W 76/30* (2018.02)

(58) Field of Classification Search
CPC ...... H04W 76/14; H04W 76/25; H04W 76/30
See application file for complete search history.

(56) References Cited

U.S. PATENT DOCUMENTS

| | | | |
|---|---|---|---|
| 2018/0063816 A1* | 3/2018 | Gulati | H04W 72/02 |
| 2018/0220366 A1 | 8/2018 | Bergstrom et al. | |
| 2019/0239160 A1 | 8/2019 | Lee et al. | |
| 2020/0367093 A1* | 11/2020 | Belleschi | H04W 28/0278 |

FOREIGN PATENT DOCUMENTS

| | | |
|---|---|---|
| CN | 108307489 A | 7/2018 |
| CN | 109155970 A | 1/2019 |
| CN | 109792792 A | 5/2019 |
| JP | 2017038117 A | 2/2017 |
| WO | 2016163834 A1 | 10/2016 |
| WO | 2018210038 A1 | 11/2018 |

OTHER PUBLICATIONS

First Office Action of Chinese Application No. 201980001724.9 dated Sep. 2, 2022 with English translation, (15p).
International Search Report of PCT/CN2019/100611 dated May 11, 2020 with English translation, (4p).
"Notification to Grant Patent Right for Invention" issued in Application No. 201980001724.9 by the State Intellectual Property Office of People's Republic of China, dated Dec. 26, 2023,(3p).

* cited by examiner

Primary Examiner — Brian P Cox
(74) Attorney, Agent, or Firm — Arch & Lake LLP

(57) ABSTRACT

An inactivity timer control method applicable to a terminal is provided. The method includes: detecting on a channel of a sidelink whether a data transmission is performed; and starting or restarting, in response to determining that the data transmission is performed on the channel of the sidelink, an inactivity timer.

20 Claims, 8 Drawing Sheets

Sending an indication message to a terminal, where the indication message indicates the terminal to start or restart, in response to a data transmission being performed on a channel of a sidelink, an inactivity timer ~ S1'

FIG. 5

Sending an indication message to a terminal, where the indication message indicates the terminal to start or restart, in response to a data transmission being performed on a channel of a sidelink, an inactivity timer ~ S1'

Sending information of at least one preset channel to the terminal ~ S2'

FIG. 6

Sending an indication message to a terminal, where the indication message indicates the terminal to start or restart, in response to a data transmission being performed on a channel of a sidelink, an inactivity timer ~ S1'

Sending information of at least one preset quality of service to the terminal ~ S3'

FIG. 7

Apparatus for controlling an inactivity timer

- Transmission detection module — 1
- Timer control module — 2

FIG. 8

Apparatus for controlling an inactivity timer

- Transmission detection module — 1
- Timer control module — 2
- First receiving module — 3

FIG. 9

```
┌─────────────────────────────────────────┐
│  Apparatus for controlling an inactivity timer  │
│   ┌─────────────────────────────────┐ 1 │
│   │  Transmission detection module  │   │
│   └─────────────────────────────────┘   │
│   ┌─────────────────────────────────┐ 2 │
│   │     Timer control module        │   │
│   └─────────────────────────────────┘   │
│   ┌─────────────────────────────────┐ 4 │
│   │    Second receiving module      │   │
│   └─────────────────────────────────┘   │
└─────────────────────────────────────────┘
```

FIG. 10

```
┌─────────────────────────────────────────┐
│  Apparatus for controlling an inactivity timer  │
│   ┌─────────────────────────────────┐ 1 │
│   │  Transmission detection module  │   │
│   └─────────────────────────────────┘   │
│   ┌─────────────────────────────────┐ 2 │
│   │     Timer control module        │   │
│   └─────────────────────────────────┘   │
│   ┌─────────────────────────────────┐ 5 │
│   │     Third receiving module      │   │
│   └─────────────────────────────────┘   │
└─────────────────────────────────────────┘
```

FIG. 11

Apparatus for indicating control of an inactivity timer

First sending module — 1'

FIG. 12

Apparatus for indicating control of the inactivity timer

First sending module — 1'

Second sending module — 2'

FIG. 13

INACTIVITY TIMER CONTROL METHOD AND DEVICE

CROSS-REFERENCE TO RELATED APPLICATION

The present application is the U.S. national phase application of International Application No. PCT/CN2019/100611, filed on Aug. 14, 2019, the entire contents of which are hereby incorporated by reference for all purposes.

TECHNICAL FIELD

The present disclosure relates to the field of communication technology, and in particular, to a method for controlling an inactivity timer, a method for indicating control of an inactivity timer, an apparatus for controlling an inactivity timer, an apparatus for indicating control of an inactivity timer, an electronic device, and a computer-readable storage medium.

BACKGROUND

The release of Radio Resource Control (RRC) connection by the user equipment is currently based on two main methods. In the first method, the base station may send an RRC connection release message to the user equipment, and the user equipment releases the RRC connection based on the RRC connection release message. In the second method, the base station configures an inactivity timer for the user equipment, and the user equipment releases the RRC connection upon an expiration of the inactivity timer.

For the second method, in the related art, when a Media Access Control Service Data Unit (MAC SDU) is received at the MAC layer on the Common Control Channel (CCCH), Dedicated Control Channel (DCCH), or Dedicated Traffic Channel (DTCH), or when a MAC Protocol Data Unit (PDU) is sent on DTCH or DCCH, the inactivity timer can be triggered to start or restart. In other words, if there is no MAC SDU is received at the MAC layer on CCCH, DCCH or DTCH, or if there is no MAC PDU is sent on DTCH or DCCH, the user equipment will be regarded as having no data sent and received, and thus the inactivity timer will keep timing until it expires to make the user equipment release the RRC connection.

With the development of communication technology, at present, the user equipment can communicate with the base station, and also directly with other user equipment through the direct link (i.e., sidelink). The sidelink resources used for communication between the user equipments are configured by the base station. In this case, the base station may configure the sidelink resources for the user equipments through broadcast configuration, and if there is no sidelink resource configured for the user equipments in the content of the broadcast, the user equipments may request sidelink resources from the base station. When the RRC connection between the user equipment and the base station is released, the sidelink resources configured by the base station for the user equipments will also be released.

SUMMARY

The present disclosure provides a method for controlling an inactivity timer, a method for indicating control of an inactivity timer, an apparatus for controlling an inactivity timer, an apparatus for indicating control of an inactivity timer, an electronic device, and a computer-readable storage medium.

According to a first aspect of the present disclosure, a method for controlling an inactivity timer is provided, which is applied to a terminal and includes: detecting on a channel of a sidelink whether a data transmission is performed; and starting or restarting, in response to determining that the data transmission is performed on the channel of the sidelink, an inactivity timer.

According to a second aspect of the present disclosure, a method for indicating control of an inactivity timer is provided, which is applied to a base station and includes: sending an indication message to a terminal, wherein the indication message indicates the terminal to start or restart, in response to determining that a data transmission is performed on a channel of a sidelink, an inactivity timer.

According to a third aspect of the present disclosure, an electronic device is provided. The electronic device includes a processor and a memory storing executable instructions for the processor. Further, the processor is configured to execute the method for controlling the inactivity timer described according to the first aspect.

According to a fourth aspect of the present disclosure, an electronic device is provided. The electronic device includes a processor and a memory storing executable instructions for the processor. Further, the processor is configured to execute the method for indicating control of the inactivity timer described according to the second aspect.

According to a fifth aspect of the present disclosure, a non-transitory computer-readable storage medium storing a computer program is provided. The program, when executed by a processor, implements steps in the method for controlling the inactivity timer according to the first aspect.

According to a sixth aspect of the present disclosure, a non-transitory computer-readable storage medium storing a computer program is provided. The program, when executed by a processor, implements steps in the method for controlling the inactivity timer according to the second aspect.

BRIEF DESCRIPTION OF THE DRAWINGS

In order to clarify the technical solutions in the embodiments of the present disclosure, the accompanying drawings used for illustrating the embodiments will be briefly described below. Obviously, the accompanying drawings in the following description show only some of the embodiments of the present disclosure, and other drawings may be obtained by a person of ordinary skill in the art without departing from the drawings described herein.

FIG. 5 is a schematic flowchart of a method for indicating control of an inactivity timer illustrated according to the embodiments of the present disclosure.

FIG. 6 is a schematic flowchart of another method for indicating control of an inactivity timer illustrated according to the embodiments of the present disclosure.

FIG. 7 is a schematic flowchart of yet another method for indicating control of an inactivity timer illustrated according to the embodiments of the present disclosure.

FIG. 8 is a schematic block diagram of an apparatus for controlling an inactivity timer illustrated according to the embodiments of the present disclosure.

FIG. 9 is a schematic block diagram of another apparatus for controlling an inactivity timer illustrated according to the embodiments of the present disclosure.

FIG. 10 is a schematic block diagram of yet another apparatus for controlling an inactivity timer illustrated according to the embodiments of the present disclosure.

FIG. 11 is a schematic block diagram of yet another apparatus for controlling an inactivity timer illustrated according to the embodiments of the present disclosure.

FIG. 12 is a schematic block diagram of an apparatus for indicating control of an inactivity timer illustrated according to the embodiments of the present disclosure.

FIG. 13 is a schematic block diagram of another apparatus for indicating control of an inactivity timer illustrated according to the embodiments of the present disclosure.

DETAILED DESCRIPTION

The technical solutions in the embodiments of the present disclosure will be clearly and completely described below with reference to the accompanying drawings in the embodiments of the present disclosure, and it is clear that the embodiments described are only some, but not all, of the embodiments of the present disclosure. Based on the embodiments in the present disclosure, all other embodiments obtained by a person of ordinary skill in the art without creative labor fall within the scope of protection of the present disclosure.

When the user equipments communicate on the sidelink, the data is sent and received on the channel of the sidelink, rather than on the CCCH, DCCH, or DTCH mentioned above. In the related art, when there is no MAC SDU sent and received on the CCCH, DCCH, or DTCH, but data is sent and received on the channel of the sidelink, the inactivity timer does not start or restart, but keep timing until it expires, causing the user equipment to release the RRC connection. However, since the user equipment needs to send and receive data on the sidelink, it still requests to establish an RRC connection with the base station so that the base station can allocate sidelink resources for the user equipment. After the RRC connection is established, the inactivity timer will still keep timing until it expires, which leads to the user equipment releases the RRC connection again. As a result, the user equipment releases the RRC connection and re-establishes the RRC connection multiple times in order to complete the sending and receiving of data on the sidelink, which wastes resources and causes a large time delay for sending and receiving data on the sidelink.

Figure 1:
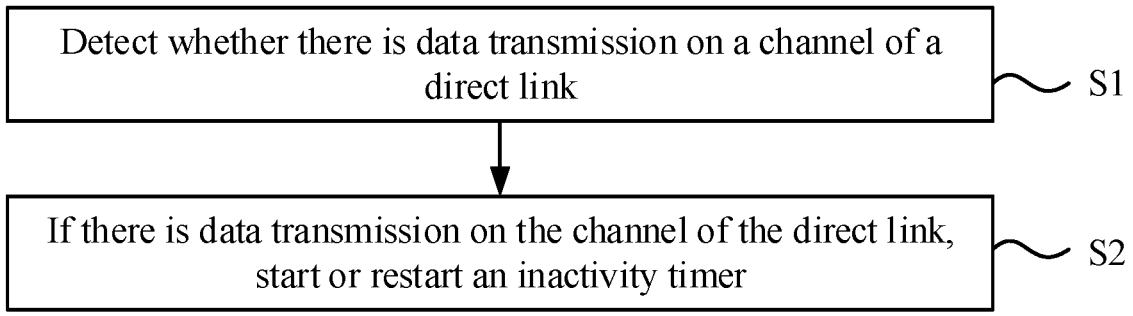
FIG. 1 is a schematic flowchart of a method for controlling an inactivity timer illustrated according to the embodiments of the present disclosure.

FIG. 1 is a schematic flowchart of a method for controlling an inactivity timer illustrated according to the embodiments of the present disclosure. The method for controlling the inactivity timer illustrated according to the embodiments of the present disclosure may be applicable to a terminal. The terminal may be an electronic device such as a cell phone, a tablet, a wearable device, etc., and may communicate with a base station as user equipment, for example, based on 4G or 5G communication technology, or communicate with other user equipment through a sidelink.

As shown in FIG. 1, the method for controlling the inactivity timer may include the following steps.

At step S1, the terminal detects on a channel of a sidelink whether a data transmission is performed.

At step S2, the terminal starts (e.g., when an inactivity timer is not yet started) or restarts (e.g., when an inactivity timer is already started), in response to the data transmission being performed on the channel of the sidelink, an inactivity timer.

Here, in response to expiration of the inactivity timer, a radio resource control connection between the terminal and the base station may be released.

In one embodiment, the channel of the sidelink may include the following types.

Sidelink Broadcast Channel (SL-BCH).
Sidelink Discovery Channel (SL-DCH).
Sidelink Shared Channel (SL-SCH).
Sidelink Broadcast Control Channel (SBCCH).
Sidelink Traffic Channel (STCH).

Among them, SL-BCH, SL-DCH, and SL-SCH, may be configured as transmission channels of the sidelink, and SBCCH and STCH may be configured as logical channels of the sidelink.

The terminal in the embodiments of the present disclosure may detect on the above-mentioned channels whether the data transmission is performed, and the data transmission may include the reception of data and the transmission of data.

According to the embodiments of the present disclosure, regardless of whether the terminal sends or receives MAC SDUs on CCCH, DCCH, or DTCH, as long as a data transmission is performed on a channel of the sidelink, the inactivity timer can be started or restarted, so that the inactivity timer will not expire when the data transmission is performed on the channel of the sidelink. In this way, the terminal will not release the RRC connection, which ensures that the sidelink resources configured by the base station for the terminal will not be released to enable the terminal to complete the communication successfully through the sidelink resources. Therefore, the resource waste and delay, caused by the user equipment releasing the RRC connection and re-establishing the RRC connection multiple times, are avoided.

Accordingly, when the inactivity timer expires, it can be determined that data transmission is completed on the channel of the sidelink, then the terminal can release the radio resource control connection with the base station, and thus release the sidelink resources configured for the terminal by the base station.

Figure 2:
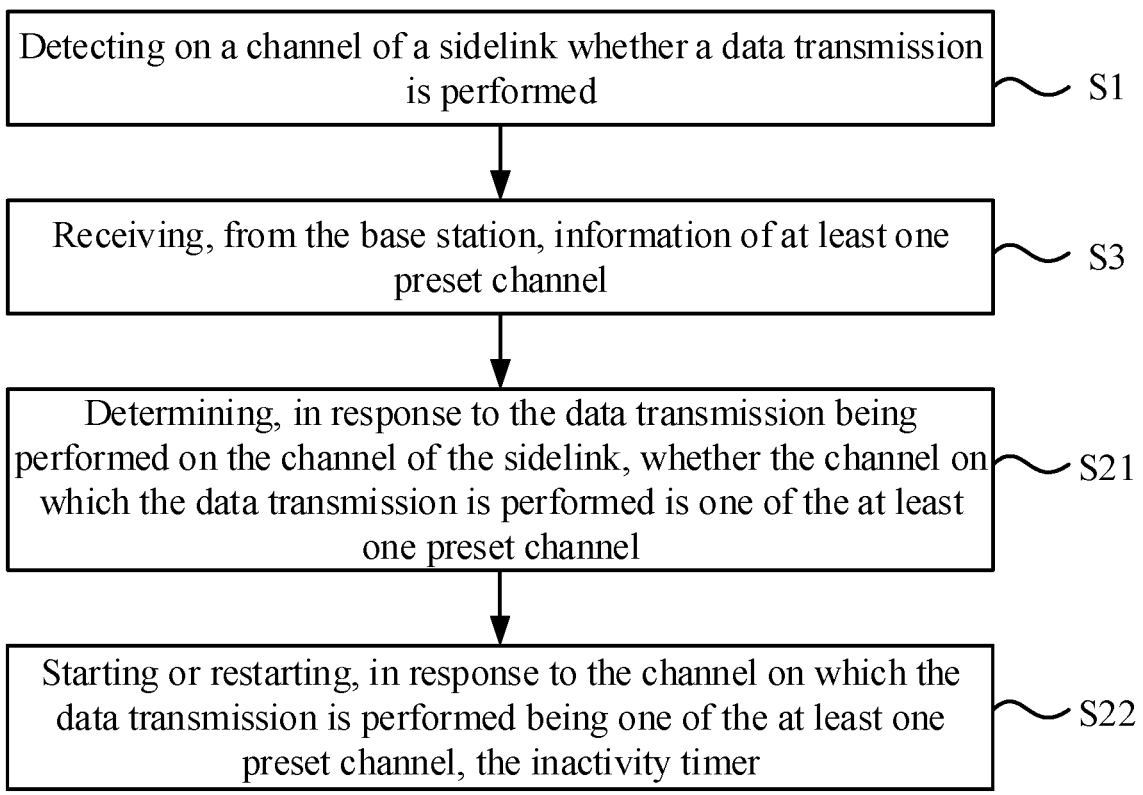
FIG. 2 is a schematic flowchart of another method for controlling an inactivity timer illustrated according to the embodiments of the present disclosure.

FIG. 2 is a schematic flowchart of another method for controlling an inactivity timer illustrated according to the embodiments of the present disclosure. As shown in FIG. 2, prior to starting or restarting, in response to the data transmission being performed on the channel of the sidelink, the inactivity timer, the method further includes the following steps.

At step S3, the terminal receives, from the base station, information of at least one preset channel.

Here, in response to the data transmission being performed on the channel of the sidelink, the step of starting or restarting the inactivity timer includes the following steps.

At step S21, the terminal determines, in response to the data transmission being performed on the channel of the sidelink, whether the channel, e.g., one or more channel of the sidelink, on which the data transmission is performed, is one of the at least one preset channel.

At step S22, the terminal starts or restarts, in response to the channel on which the data transmission is performed being one of the at least one preset channel, the inactivity timer.

In one embodiment, the base station may further send information of at least one preset channel to the terminal, by which the terminal can be indicated to start or restart the inactivity timer only when the channel on which the data transmission is performed is one of the at least one preset channel.

After receiving the information of the at least one preset channel, the terminal may further determine, when a data transmission is performed on a channel of the sidelink, whether the channel on which the data transmission is performed is one of the at least one preset channel, and then start or restart the inactivity timer only when the channel on which the data transmission is performed is one of the at least one preset channel.

In this way, the base station may indicate the terminal to start or restart the inactivity timer only when the data transmission is performed on a specified channel (i.e., any one of the at least one preset channel). When no data transmission is performed on the specified channel, the inactivity timer may not be started or restarted even if the data transmission is performed on other channels, thereby increasing the flexibility of the base station to configure the terminal.

In some embodiments, the information of the at least one preset channel includes an identifier list of the at least one preset channel.

In one embodiment, the information of the at least one preset channel may be carried by means of an identifier list, and an identifier of each of the at least one preset channel is included in the identifier list. The terminal may obtain one or more identifiers in the identifier list, determine that the channel corresponding to each obtained identifier is a preset channel, and thereby determine whether the channel on which the data transmission is performed is one of the at least one preset channel.

For example, the identifier list of the at least one preset channel includes the identifiers "A", "B", and "C". After the terminal receives the identifier list, in the case that a data transmission is performed on a channel of the sidelink, the terminal may start or restart the inactivity timer once it is determined that the identifier, of the channel on which the data transmission is performed, is A, which belongs to the identifier list, or the terminal may not start or restart the inactivity timer once it is determined that the identifier, of the channel on which a data transmission is performed, is D, which does not belong to the identifier list.

In some embodiments, the at least one preset channel is a logical channel.

In one embodiment, the at least one preset channel may be the logical channel, for example, includes a Sidelink Broadcast Control Channel, and a Sidelink Traffic Channel.

Figure 3:
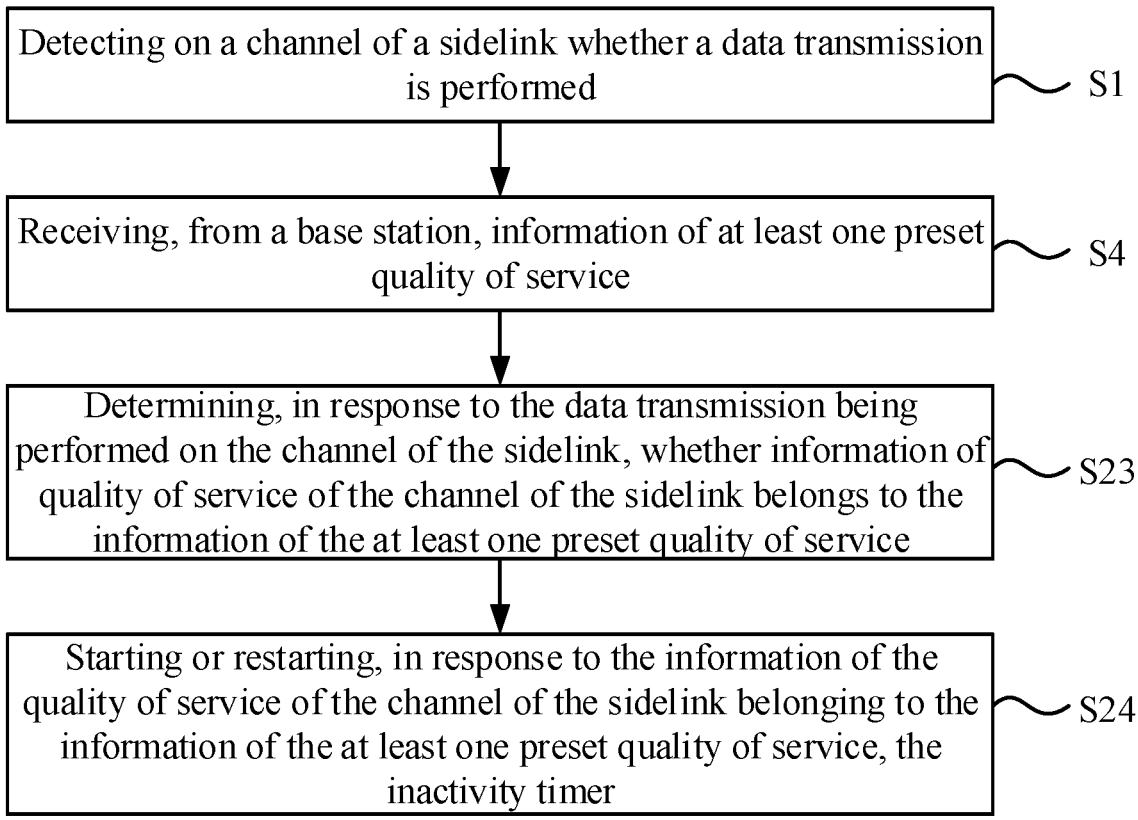
FIG. 3 is a schematic flowchart of yet another method for controlling an inactivity timer illustrated according to the embodiments of the present disclosure.

FIG. 3 is a schematic flowchart of yet another method for controlling an inactivity timer illustrated according to the embodiments of the present disclosure. As shown in FIG. 3, prior to starting or restarting, in response to the data transmission being performed on the channel of the sidelink, the inactivity timer, the method further includes the following steps.

At step S4, the terminal receives, from a base station, information of at least one preset quality of service.

Here, in response to the data transmission being performed on the channel of the sidelink, the step of starting or restarting the inactivity timer includes the following steps.

At step S23, the terminal determines, in response to the data transmission being performed on the channel of the sidelink, whether information of quality of service of the channel of the sidelink (e.g., one or more channels of the sidelink) belongs to the information of the at least one preset quality of service.

At step S24, the terminal starts or restarts, in response to the information of the quality of service of the channel of the sidelink belonging to the information of the at least one preset quality of service, the inactivity timer.

In one embodiment, the base station may send to the terminal the information of at least one preset quality of service, by which the terminal may be indicated to start or restart the inactivity timer only when the information, on the quality of service of the channel of the sidelink on which the data transmission is performed, belongs to the information of the at least one preset quality of service.

After the terminal receives the information of the at least one preset quality of service, the terminal may further determine, when a data transmission is performed on a channel of the sidelink, whether the information, on the quality of service of the channel of the sidelink on which the data transmission is performed, belongs to the information of the at least one preset quality of service, and then start or restart the inactivity timer only when the information of the quality of service of the channel of the sidelink on which the data transmission is performed belongs to the information of the at least one preset quality of service.

In this way, the base station may indicate the terminal to start or restart the inactivity timer only when the information, on the quality of service of the channel of the sidelink on which the data transmission is performed, is the same as the information of a specified quality of service (i.e., the information of any one of the at least one quality of service), in order to improve the flexibility of the base station to configure the terminal.

In some embodiments, the information of the at least one preset quality of service includes at least one preset Prose Quality of Service Indication (PQI).

In one embodiment, the information of the at least one preset quality of service, which may be represented by a quality of service indication, may specifically be the preset Prose Quality of Service Indication (Prose QoS Indication, or PQI). The terminal, for a channel on which the data transmission is performed, may detect the quality of service (i.e., Quality of Service, or QoS) of the channel, and further determine the QoS indication based on the QoS determined by the detection. Thus, the QoS indication can be determined by the terminal whether it belongs to at least one preset Prose Quality of Service Indication. In this case, the at least one preset Prose Quality of Service Indication may be carried a list.

For example, the at least one preset Prose Quality of Service Indication includes indication X, indication Y, and indication Z. After the terminal receives the at least one preset Prose Quality of Service Indication, in the case that a data transmission is performed on a channel of the sidelink, the terminal may start or restart the inactivity timer once it is determined that the quality of service indication of the channel on which the data transmission is performed is X, which is one of the at least one preset Prose Quality of Service Indication, or the terminal may not start or restart the inactivity timer once it is determined that the quality of service indication of the channel on which the data transmission is performed is W, which does not belong to the at least one preset Prose Quality of Service Indication.

Figure 4:
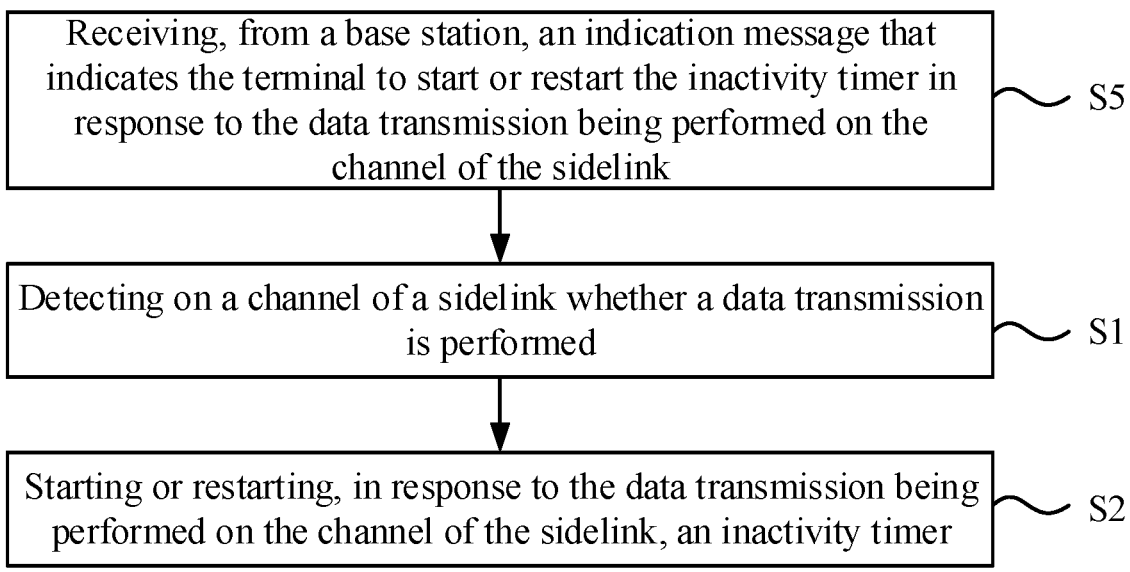
FIG. 4 is a schematic flowchart of yet another method for controlling an inactivity timer illustrated according to the embodiments of the present disclosure.

FIG. 4 is a schematic flowchart of yet another method for controlling an inactivity timer illustrated according to the embodiments of the present disclosure. As shown in FIG. 4, prior to detecting on the channel of the sidelink whether the data transmission is performed, the method further includes the following steps.

At step S5, the terminal receives, from a base station, an indication message that indicates the terminal to start or restart the inactivity timer in response to the data transmission being performed on the channel of the sidelink.

In one embodiment, the terminal may by default (e.g. as specified in the communication protocol with the base station) start or restart, in response to the data transmission being performed on the channel of the sidelink, the inactivity timer only in case of receiving the indication message from the base station.

According to the embodiment shown in FIG. 4, the terminal may also start or restart the inactivity timer only after the indication message sent by the base station is received and only when the data transmission is performed on the channel of the sidelink. And in the case that the terminal does not receive the indication message sent by the base station, and there is no data reception of MAC SDUs on CCCH, DCCH, or DTCH, or no sending of MAC PDUs on DTCH, or DCCH, the terminal starts or restarts the inactivity timer regardless of whether the data transmission is performed on the channel of the sidelink.

Accordingly, the operation of starting or restarting the inactivity timer in the case of data transmission on the channel of the sidelink can be made controllable by the terminal, and the flexibility of the base station to configure the terminal is improved.

FIG. 5 is a schematic flowchart of a method for indicating control of an inactivity timer illustrated according to the embodiments of the present disclosure. The method for indicating control of the inactivity timer illustrated according to the embodiments of the present disclosure may be applicable to a base station. The base station may communicate with a terminal, for example, may be based on 4G or 5G communication technology, and the terminal may be an electronic device such as a cell phone, a tablet, a wearable device, etc. The terminal may communicate with the base station as user equipment or may communicate with other user equipment through a sidelink.

As shown in FIG. 5, the method for indicating control of the inactivity timer may include the following steps.

At step S1', the base station sends an indication message to a terminal, where the indication message indicates the terminal to start or restart, in response to a data transmission being performed on a channel of a sidelink, an inactivity timer.

According to embodiments of the present disclosure, by indicating the terminal to start or restart the inactivity timer in response to the data transmission performed on the channel of the sidelink, the inactivity timer can be started or restarted regardless of whether the terminal sends or receives MAC SDUs on the CCCH, DCCH, or DTCH, as long as data transmission performed on the channel of the sidelink.

In this way, the inactivity timer will not expire when the data transmission is performed on the channel of the sidelink, then the terminal will not release the RRC connection, which ensures that the sidelink resources configured by the base station for the terminal will not be released so that the terminal can complete the communication successfully through the sidelink resources. Therefore, the resource waste and delay, caused by the user equipment releasing the RRC connection and re-establishing the RRC connection multiple times, are avoided.

FIG. 6 is a schematic flowchart of another method for indicating control of an inactivity timer illustrated according to the embodiments of the present disclosure. As shown in FIG. 6, the method further includes the following steps.

At step S2', the base station sends information of at least one preset channel to the terminal.

In one embodiment, the base station may further send to the terminal information of at least one preset channel, by which the terminal can be indicated to start or restart the inactivity timer only when the channel on which the data transmission is performed is one of the at least one preset channel.

After the terminal receives the information of the at least one preset channel, the terminal may further determine whether the channel, on which the data transmission is performed, is one of the at least one preset channel, and may start or restart the inactivity timer only when the channel on which the data transmission is performed is one of the at least one preset channel.

In this way, the base station may indicate the terminal to start or restart the inactivity timer only when the data transmission is performed on a specified channel (i.e., any one of the at least one preset channel). When no data transmission is performed on the specified channel, the inactivity timer may not be started or restarted even if the data transmission is performed on other channels, thereby increasing the flexibility of the base station to configure the terminal.

In some embodiments, the information of the at least one preset channel includes an identifier list of the at least one preset channel.

In some embodiments, the at least one present channel is a logic channel.

FIG. 7 is a schematic flowchart of yet another method for indicating control of an inactivity timer illustrated according to the embodiments of the present disclosure. As shown in FIG. 7, the method further includes the following steps.

At step S3', the base station sends information of at least one preset quality of service to the terminal.

In one embodiment, the base station may send to the terminal the information of at least one preset quality of service, by which the terminal may be indicated to start or restart the inactivity timer only when the information, on the quality of service of the channel of the sidelink on which the data transmission is performed, belongs to the information of the at least one preset quality of service.

After the terminal receives the information of the at least one preset quality of service, the terminal may further determine, when the data transmission is performed on the channel of the sidelink, whether the information, on the quality of service of the channel of the sidelink on which the data transmission is performed, belongs to the information of the at least one preset quality of service, and then start or restart the inactivity timer only when the information of the quality of service of the channel of the sidelink on which the data transmission is performed belongs to the information of the at least one preset quality of service.

In this way, the base station may indicate the terminal to start or restart the inactivity timer only when the information, on the quality of service of the channel of the sidelink on which the data transmission is performed, is the same as the information of a specified quality of service (i.e., the information of any one of the at least one quality of service), in order to improve the flexibility of the base station to configure the terminal.

In some embodiments, the information of the at least one preset quality of service includes at least one preset Prose Quality of Service Indication (PQI).

The present disclosure also provides embodiments of an apparatus for controlling an inactivity timer and an apparatus for indicating control of an inactivity timer, corresponding to the aforementioned embodiments of the method for controlling the inactivity timer and the method for indicating control of the inactivity timer.

FIG. 8 is a schematic block diagram of an apparatus for controlling an inactivity timer illustrated according to the embodiments of the present disclosure, which may be applicable to a terminal. The terminal may be an electronic device such as a cell phone, a tablet, a wearable device, etc., and may communicate with a base station as user equipment, for example, based on 4G or 5G communication technology, or communicate with other user equipment through a sidelink.

As shown in FIG. 8, the apparatus for controlling an inactivity timer may include: a transmission detection module 1, configured to detect on a channel of a sidelink whether a data transmission is performed; and a timer control module 2, configured to start or restart, in response to the data transmission being performed on the channel of the sidelink, an inactivity timer.

FIG. 9 is a schematic block diagram of another apparatus for controlling an inactivity timer illustrated according to the embodiments of the present disclosure. As shown in FIG. 9, the apparatus further includes: a first receiving module 3, configured to receive, from a base station, information of at least one preset channel.

Here, the timer control module 2 is configured to determine, in response to the data transmission being performed on the channel of the sidelink, whether the channel on which the data transmission is performed is one of the at least one preset channel; and start or restart, in response to the channel on which the data transmission is performed being one of the at least one preset channel, the inactivity timer.

In some embodiments, the information of the at least one preset channel includes an identifier list of the at least one preset channel.

In some embodiments, the at least one present channel is a logic channel.

FIG. 10 is a schematic block diagram of yet another apparatus for controlling an inactivity timer illustrated according to the embodiments of the present disclosure. As shown in FIG. 10, the apparatus further includes a second receiving module 4, configured to receive, from a base station, information of at least one preset quality of service.

Here, the timer control module 2 is configured to determine, in response to the data transmission being performed on the channel of the sidelink, whether information of quality of service of the channel of the sidelink belongs to the information of the at least one preset quality of service; and start or restart, in response to the information of the quality of service of the channel of the sidelink belonging to the information of the at least one preset quality of service, the inactivity timer.

In some embodiments, the information of the at least one preset quality of service includes at least one preset Prose Quality of Service Indication (PQI).

FIG. 11 is a schematic block diagram of yet another apparatus for controlling an inactivity timer illustrated according to the embodiments of the present disclosure. As shown in FIG. 11, the apparatus further includes a third receiving module 5, configured to receive, from a base station, an indication message, where the indication message indicates the terminal to start or restart the inactivity timer in response to the data transmission being performed on the channel of the sidelink.

FIG. 12 is a schematic block diagram of an apparatus for indicating control of an inactivity timer illustrated according to the embodiments of the present disclosure. The apparatus for indicating control of the inactivity timer illustrated according to the embodiments of the present disclosure may be applicable to a base station. The base station may communicate with a terminal, for example, may be based on 4G or 5G communication technology, and the terminal may be an electronic device such as a cell phone, a tablet, a wearable device, etc. The terminal may communicate with the base station as user equipment or may communicate with other user equipment through a sidelink.

As shown in FIG. 12, the apparatus for indicating control of the inactivity timer may include a first sending module 1', configured to send an indication message to a terminal, where the indication message indicates the terminal to start or restart, in response to a data transmission being performed on a channel of a sidelink, an inactivity timer.

FIG. 13 is a schematic block diagram of another apparatus for indicating control of an inactivity timer illustrated according to the embodiments of the present disclosure. As shown in FIG. 13, the apparatus further includes a second sending module 2', configured to send information of at least one preset channel to the terminal.

In some embodiments, the information of the at least one preset channel includes an identifier list of the at least one preset channel.

In some embodiments, the at least one present channel is a logic channel.

Figures 14, 15:
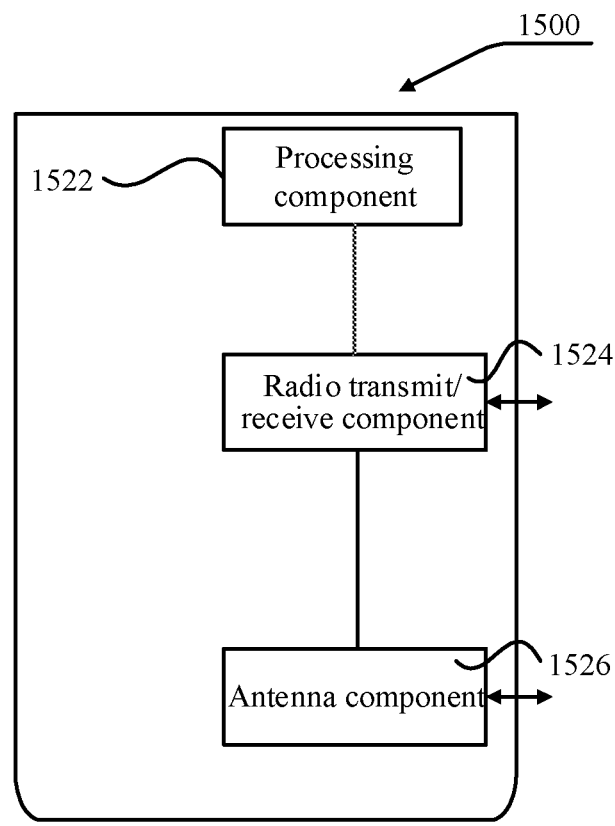
FIG. 14 is a schematic block diagram of yet another apparatus for indicating control of an inactivity timer illustrated according to the embodiments of the present disclosure.
FIG. 15 is a schematic block diagram of a device for indicating control of an inactivity timer illustrated according to the embodiments of the present disclosure.

FIG. 14 is a schematic block diagram of yet another apparatus for indicating control of an inactivity timer illustrated according to the embodiments of the present disclosure. As shown in FIG. 14, the apparatus further includes a third sending module 3' configured to send information of at least one preset quality of service to the terminal.

In some embodiments, the information of the at least one preset quality of service includes at least one preset Prose Quality of Service Indication (PQI).

With respect to the apparatus in the above embodiments, the specific manner in which each module performs its operation is already described in detail in the relevant method embodiment, and will not be repeated here.

For the apparatus embodiments, since it corresponds generally to the method embodiments, it is sufficient to refer to the method embodiments for the relevant part of the description. The apparatus embodiments described above are merely schematic, where the modules described as separate components may or may not be physically separated, and the components shown as modules may or may not be physical modules, i.e., they may be located in one place or may be distributed to multiple network modules. Some or all of these modules can be selected according to practical needs to achieve the purpose of the solution of the embodiments. It can be understood and implemented by a person of ordinary skill in the art without departing from this application.

The embodiments of the present disclosure further provides an electronic device, which includes a processor and a memory storing executable instructions for the processor, where the processor is configured to execute the method for controlling the inactivity timer described in any one of above embodiments.

The embodiments of the present disclosure further provides an electronic device, which includes a processor and a memory storing executable instructions for the processor, where the processor is configured to execute the method for indicating control of the inactivity timer described in any one of above embodiments.

The embodiments of the present disclosure further provides a computer-readable storage medium storing a computer program, where the program, when executed by a processor, implements steps in the method for controlling the inactivity timer described in any one of above embodiments.

The embodiments of the present disclosure further provides a computer-readable storage medium storing a computer program, where the program, when executed by a processor, implements steps in the method for indicating control of the inactivity timer described in any one of above embodiments.

As shown in FIG. 15, FIG. 15 is a schematic block diagram of a device 1500 for indicating control of an inactivity timer illustrated according to the embodiments of the present disclosure. The device 1500 may be served as a base station. Referring to FIG. 15, the device 1500 includes a processing component 1522, a radio transmit/receive component 1524, an antenna component 1526, and a signal processing portion specific to the radio interface, and the processing component 1522 may further include one or more processors. One of the processors in the processing component 1522 may be configured to implement the method for indicating control of an inactivity timer as described in any one of above embodiments.

Figure 16:
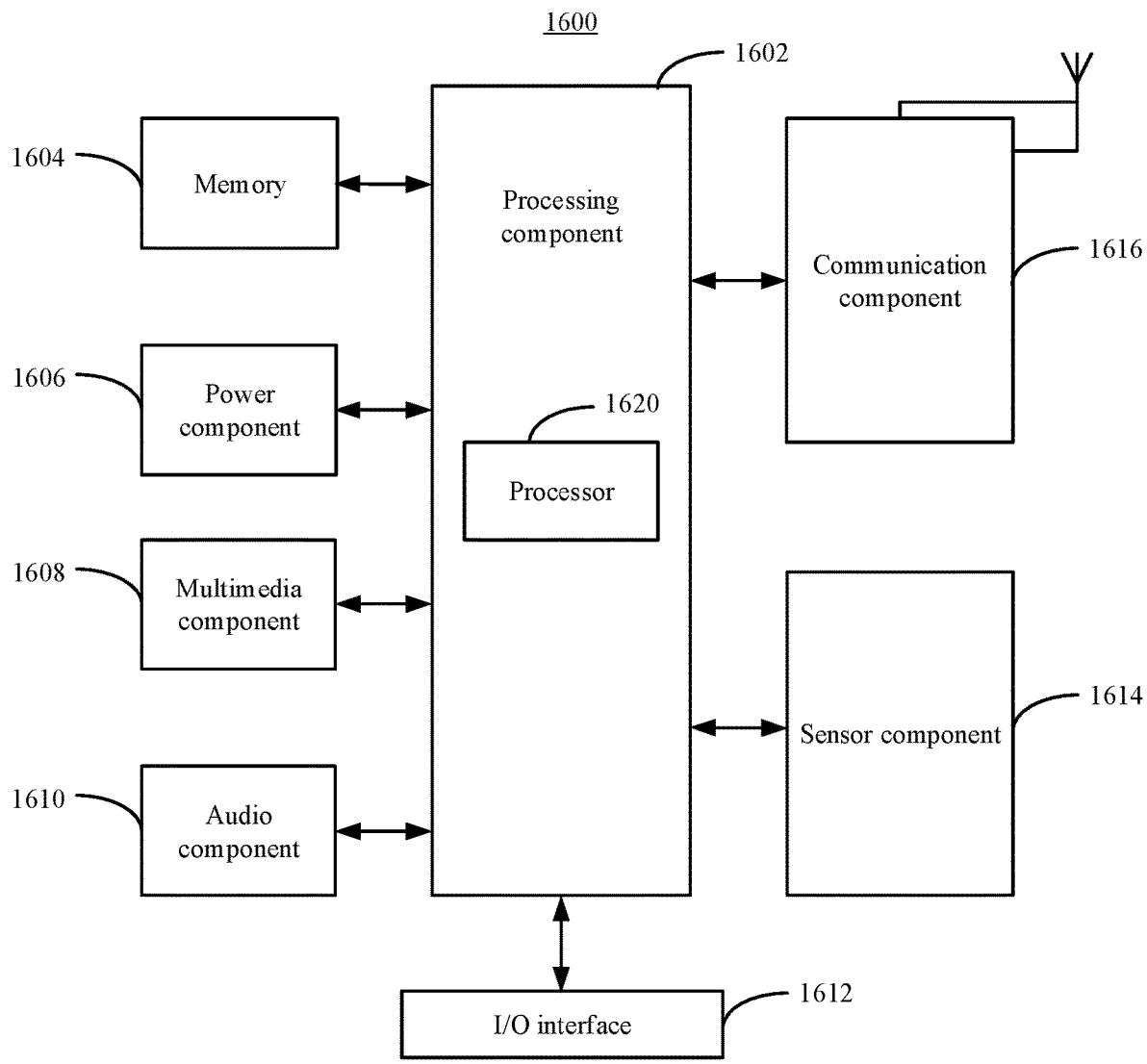
FIG. 16 is a schematic block diagram of a device for controlling an inactivity timer illustrated according to the embodiments of the present disclosure.

FIG. 16 is a schematic block diagram of a device 1600 for controlling an inactivity timer illustrated according to the embodiments of the present disclosure. For example, the device 1600 may be may be a cell phone, a computer, a digital broadcast terminal, a message sending and receiving device, a game console, a tablet device, a medical device, a fitness device, a personal digital assistant, and the like.

Referring to FIG. 16, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls the overall operation of the device 1600, such as operations associated with display, phone call, data communication, camera operation, and recording operations. The processing component 1602 may include one or more processors 1620 to execute instructions to complete all or some of the steps of the method described above. In addition, the processing component 1602 may include one or more modules that facilitate interaction between processing component 1602 and other components. For example, processing component 1602 may include a multimedia module to facilitate interaction between multimedia component 1608 and processing component 1602.

The memory 1604 is configured to store various types of data to support operation at the electronic device 1600. Examples of such data include instructions for any application or method of operation on the device 1600, contact data, phonebook data, messages, images, videos, etc. The memory 1604 can be implemented by any type of transitory or non-transitory storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 1606 provides power to the various components of the device 1600. The power component 1606 may include a power management system, one or more power supplies, and other components associated with generating, managing, and distributing power for the device 1600.

The multimedia component 1608 includes a screen providing an output interface between the device 1600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 1608 includes a front-facing camera and/or a rear-facing camera. The front camera and/or rear camera can receive external multimedia data when the electronic device 1600 is in an operating mode, such as shooting mode or video mode. Each front camera and rear camera may be a fixed optical lens system or have focal length and optical zoom capability.

The audio component 1610 is configured to output and/or input audio signals. For example, the audio component 1610 includes a microphone (MIC) configured to receive external audio signals when the device 1600 is in an operating mode, such as call mode, recording mode, and voice recognition mode. The received audio signal may be further stored in memory 1604 or sent via communication component 1616. In some embodiments, the audio component 1610 further includes a speaker for outputting audio signals.

The I/O interface 1612 provides an interface between the processing component 1602 and a peripheral interface module, the peripheral interface module may be a keyboard, click wheel, button, etc. These buttons may include, but are not limited to: a home button, a volume button, a start button, and a lock button.

The sensor component 1614 includes one or more sensors for providing status assessment of various aspects of the device 1600. For example, the sensor component 1614 may detect an open/closed state of the device 1600, the relative positioning of components, such as the components being the display and keypad of the device 1600, the sensor component 1614 may also detect a change in position of the device 1600 or a component of the device 1600, the presence or absence of user contact with the device 1600, the orientation or acceleration/deceleration of the device 1600 and temperature changes of the device 1600. The sensor component 1614 may include a proximity sensor configured to detect the presence of a nearby object in the absence of any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication between the device 1600 and other devices by wired or wireless means. The device 1600 may access a wireless network based on a communication standard, such as WiFi, 2G, 3G, 4G (LTE), 5G, or a combination thereof. In one embodiment, communication component 1616 receives broadcast signals or broadcast-related information from an external broadcast management system via a broadcast channel. In an embodiment, the communication component 1616 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 1600 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method for controlling an inactivity timer as described in any one of the above embodiments.

In some embodiments, there is also provided a non-transitory computer readable storage medium including instructions, such as a memory 1604 including instructions, the instructions being executable by the processor 1620 of the device 1600 to accomplish the method described above. For example, said non-transitory computer readable storage medium may be ROM, random access memory (RAM), CD-ROM, magnetic tape, floppy disk, and optical data storage devices, among others.

According to the above embodiments of the present disclosure, regardless of whether the terminal sends or receives MAC SDUs on CCCH, DCCH, or DTCH, as long as there is a data transmission performed on the channel of the sidelink, the inactivity timer can be started or restarted, so that the inactivity timer will not expire when there is a data transmission performed on the channel of the sidelink. In this way, the terminal will not release the RRC connection, and thus ensure that the sidelink resources configured by the base station for the terminal will not be released to enable the terminal to complete the communication successfully through the sidelink resources. Therefore, the resource waste and delay, caused by the user equipment releasing the RRC connection and re-establishing the RRC connection multiple times, are avoided.

Those skilled in the art will easily expect other embodiments of the present disclosure upon consideration of the specification and practice of the disclosure disclosed herein. This disclosure is intended to cover any variations, uses, or adaptations of the present disclosure that follow the general principles of the present disclosure and include commonly known or customary technical means in the art that are not disclosed herein. The specification and embodiments are considered exemplary only, and the true scope and spirit of the present disclosure is indicated by the following claims.

It should be understood that the present disclosure is not limited to the precise structure already described above and illustrated in the accompanying drawings, and that various modifications and changes may be made without departing from its scope. The scope of the present disclosure is limited only by the appended claims.

It is noted that in this document, relationship terms such as "first" and "second" are used only to distinguish one entity or operation from another, and do not necessarily require or imply any such actual relationship or order between these entities or operations. The term "includes," "comprises," or any other variation thereof, is intended to cover non-exclusive inclusion so that a process, method, article, or apparatus that includes a set of elements includes not only those elements, but also other elements not explicitly listed, or also includes the process, method, article, or apparatus for which such process, method, article, or apparatus is intended, or further include elements that are inherent to such process, method, article, or apparatus. Without further limitation, the elements defined by the statement "including a/an . . . " do not preclude the existence of additional identical elements in the process, method, article, or apparatus that includes the elements.

The method and apparatus provided by the embodiments of the present disclosure are described in detail above, and specific examples are used to illustrate the principles and implementation of the present disclosure. The above description of the embodiments is only used to help understand the method of the present disclosure and its core ideas; at the same time, for a person of ordinary skill in the art, there will be changes in the specific implementation and scope of application based on the ideas of the present disclosure, and in summary, the contents of this specification should not be construed as a limitation of the present disclosure.

What is claimed is:

1. A method for controlling an inactivity timer, comprising:
    detecting, by a terminal, on a channel of a sidelink whether a data transmission is performed; and
    starting or restarting, by the terminal and in response to determining that the data transmission is performed on the channel of the sidelink, an inactivity timer;
    wherein the method further comprises:
    receiving, from a base station, information of at least one preset quality of service; wherein starting or restarting the inactivity timer in response to determining that the data transmission is performed on the channel of the sidelink comprises:
    determining, in response to determining that the data transmission is performed on the channel of the sidelink, whether information of quality of service of the channel of the sidelink belongs to the information of the at least one preset quality of service; and
    starting or restarting, in response to determining that the information of the quality of service of the channel of the sidelink belongs to the information of the at least one preset quality of service, the inactivity timer.

2. The method of claim 1, further comprising:
    receiving, from the base station, information of at least one preset channel; wherein starting or restarting the inactivity timer in response to determining that the data transmission is performed on the channel of the sidelink comprises:
    determining, in response to determining that the data transmission is performed on the channel of the sidelink, whether the channel on which the data transmission is performed is one of the at least one preset channel; and starting or restarting, in response to determining that the channel on which the data transmission is performed is one of the at least one preset channel, the inactivity timer.

3. The method of claim 2, wherein the information of the at least one preset channel comprises an identifier list of the at least one preset channel.

4. The method of claim 2, wherein the at least one present channel is a logic channel.

5. The method of claim 1, wherein the information of the at least one preset quality of service comprises at least one preset Prose Quality of Service Indication (PQI).

6. The method of claim 1, wherein before detecting on the channel of the sidelink whether the data transmission is performed, the method further comprises:
receiving, from the base station, an indication message indicating the terminal to start or restart the inactivity timer in response to determining that the data transmission is performed on the channel of the sidelink.

7. A non-transitory computer-readable storage medium, storing a computer program, wherein:
the program, when executed by a processor, implements steps in the method for controlling the inactivity timer of claim 1.

8. A method for indicating control of an inactivity timer, comprising:
sending, by a base station, an indication message to a terminal, wherein the indication message indicates the terminal to start or restart, in response to determining that a data transmission is performed on a channel of a sidelink, an inactivity timer;
wherein the method further comprises:
sending information of at least one preset quality of service to the terminal, wherein the information of the at least one preset quality of service is configured to indicate the terminal to start or restart the inactivity timer in response to determining that information of quality of service of the channel of the sidelink, on which the data transmission is performed, belongs to the information of the at least one preset quality of service.

9. The method of claim 8, further comprising:
sending information of at least one preset channel to the terminal.

10. The method of claim 9, wherein the information of the at least one preset channel comprises an identifier list of the at least one preset channel.

11. The method of claim 9, wherein the at least one present channel is a logic channel.

12. The method of claim 8, wherein the information of the at least one preset quality of service comprises at least one preset Prose Quality of Service Indication (PQI).

13. An electronic device, comprising:
a processor; and
a memory storing executable instructions for the processor;
wherein the processor is configured to execute the method for indicating control of the inactivity timer of claim 8.

14. A non-transitory computer-readable storage medium, storing a computer program, wherein:
the program, when executed by a processor, implements steps in the method for indicating control of the inactivity timer of claim 8.

15. An electronic device, comprising:
a processor; and
a memory storing executable instructions for the processor;
wherein the processor is configured to:
detect on a channel of a sidelink whether a data transmission is performed; and
start or restart, in response to determining that the data transmission is performed on the channel of the sidelink, an inactivity timer; wherein the processor is further configured to:
receive, from a base station, information of at least one preset quality of service; and
wherein the processor is configured to start or restart the inactivity timer by:
determining, in response to determining that the data transmission is performed on the channel of the sidelink, whether information of quality of service of the channel of the sidelink belongs to the information of the at least one preset quality of service; and
starting or restarting, in response to determining that the information of the quality of service of the channel of the sidelink belongs to the information of the at least one preset quality of service, the inactivity timer.

16. The electronic device of claim 15, wherein the processor is further configured to:
receive, from the base station, information of at least one preset channel; and
wherein the processor is configured to start or restart the inactivity timer by:
determining, in response to determining that the data transmission is performed on the channel of the sidelink, whether the channel on which the data transmission is performed is one of the at least one preset channel; and
starting or restarting, in response to determining that the channel on which the data transmission is performed is one of the at least one preset channel, the inactivity timer.

17. The electronic device of claim 16, wherein the information of the at least one preset channel comprises an identifier list of the at least one preset channel.

18. The electronic device of claim 16, wherein the at least one present channel is a logic channel.

19. The electronic device of claim 15, wherein the processor is further configured to:
receive, from the base station, an indication message indicating the terminal to start or restart the inactivity timer in response to determining that the data transmission is performed on the channel of the sidelink.

20. The electronic device of claim 15, wherein the information of the at least one preset quality of service comprises at least one preset Prose Quality of Service Indication (PQI).

* * * * *